April 8, 1924.
J. C. NICHOLS
1,489,502
HARNESS CONNECTER AND ADJUSTER
Filed May 22, 1923
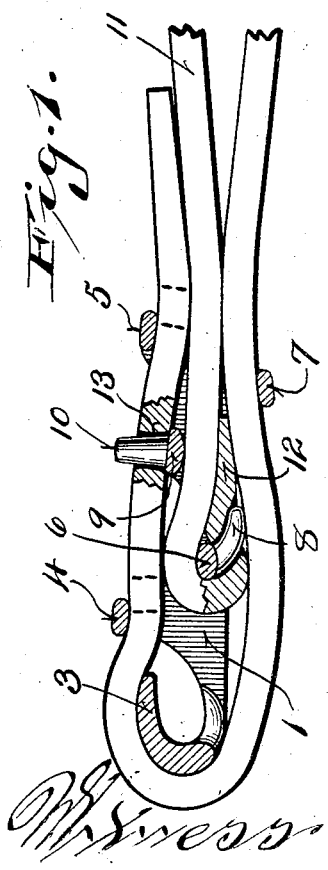
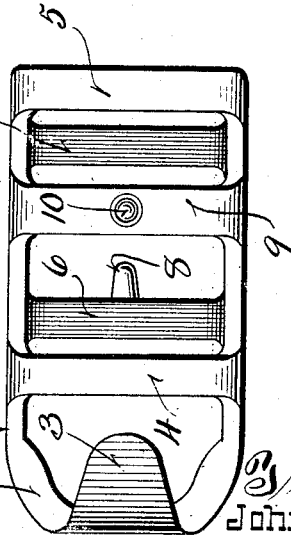
Inventor
John C. Nichols Patented Apr. 8, 1924.

1,489,502

UNITED STATES PATENT OFFICE.

JOHN C. NICHOLS, OF SHEBOYGAN, WISCONSIN.

HARNESS CONNECTER AND ADJUSTER.

Application filed May 22, 1923. Serial No. 640,681.

*To all whom it may concern:*

Be it known that I, JOHN C. NICHOLS, a citizen of the United States, and resident of Sheboygan, in the county of Sheboygan and State of Wisconsin, have invented certain new and useful Improvements in Harness Connecters and Adjusters; and I do hereby declare that the following is a full, clear, and exact description thereof.

This invention relates to a harness adjuster and connecter.

This case constitutes one of a series of cases filed simultaneously having elements cooperating to form a harness without stitching.

An object of this invention is to provide a harness connecter and adjuster which is so organized that it may be employed to adjustably join the ends of a strap to form an adjustable loop in such strap.

Further objects are to provide a harness adjuster and connecter in which the end loop of the strap is protected by a metallic hook which is positioned inside of the loop and takes the wear imposed by the ring or other member to which the hook is attached; and to provide means whereby the length of the strap or of the loop may be most readily and easily adjusted.

Further objects are to provide a harness connecter and adjuster which has all of the advantages of an adjustable harness buckle but which does not require the stitching of the attached end of the strap, which is devoid of relatively movable parts, which is integral throughout and which may be readily and cheaply manufactured.

An embodiment of the invention is shown in the accompanying drawings, in which:

Figure 1 is a longitudinal sectional view through the harness protector and adjuster showing a strap in position thereon.

Figure 2 is a face view of the device.

Figure 3 is an edge view thereof.

The harness connecter and adjuster comprises a pair of parallel side walls 1 which are connected by means of converging arms 2 with an inwardly directed hook 3. A pair of outer transverse bars 4 and 5 join the upper margins of the side walls—the bar 4 being located closely adjacent the free end of the hook for a purpose hereinafter to appear.

A pair of transverse bars 6 and 7 join the lower margins of the side walls 1 and are spaced inwardly of the outer bars 4 and 5. The bar 6 is provided with an inwardly directed prong 8. An intermediate bar 9 is located between the bars 4 and 5 and above the bars 6 and 7. It is provided with an upwardly projecting stud or prong 10.

It is to be noted that due to the open work construction of the apparatus and the staggered arrangement of the bars that the apparatus may be most readily cast in a simple type of mould without the necessity of employing elaborate cores. It will also be seen that the apparatus is of integral construction throughout and is devoid of relatively movable parts.

This device may be used in a large number of places upon a harness as is obvious from the description thus far given, but for the purpose of illustration, it has been shown as applied to a breast strap 11, and the description of the operation will be directed to such use although it is to be distinctly understood that the specific manner of using it may be varied and is not intended in any way as limiting the scope of the invention.

In using the device, the breast strap 11 has its apertured end 12 folded or wrapped around the bar 6 and the prong 8 is directed through the aperture in such end, thereby securely locking the end of the strap in place. Thereafter, the loop is formed, as illustrated in Figure 2, and the strap is then passed above the bar 7, around the hook 3, beneath the bar 4, over the bar 9 and beneath the bar 5. The prong 10 is passed through any one of a series of apertures 13 formed in the adjustable end of the strap, and it will be noted that if tension is applied to the strap, the portion thereof, between the bars 4 and 5 tends to straighten out and to tightly bear downwardly against the intermediate bar 9 thereby insuring the correct retaining of the strap upon the stud 10.

It will further be noted that the end 12 of the strap is securely held in position both by the curved formation of the prong 8 and by the overlapping portion of the strap 11.

It will further be noted that the hook 3 may engage a ring or D or similar member, and that a metal to metal contact will be provided, and all wear or cutting of the strap will be avoided. It is obvious that the hook may be flat faced or slightly rounded so as to cooperate with a round ring or with the straight portion of a D or similar member.

It will further be seen that when tension is applied to the strap that no sharp bends are formed therein, but that the strap assumes a very gradual curvature adjacent each of the bars and consequently the tendency to break is reduced to a minimum.

It is further to be noted that when the strap is slackened that the bars 4 and 5 hold the strap in position upon the stud 10 and that the bar 4 being located closely adjacent the free end of the hook holds the strap downwardly at such free end and prevents the ring or other member from working free of the hook.

Although the invention has been described in considerable detail, it is to be understood that it is not limited to the exact disclosure as it may be variously embodied, and is to be limited only as set forth in the appended claims.

I claim:

1. A harness strap connecter and adjuster comprising a hooked end, a pair of side walls extending therefrom, a pair of outer transverse bars connecting the upper margins of the side walls, a pair of transverse bars connecting the lower margins of the side walls and arranged inwardly of the outer transverse bars, and an intermediate bar having a stud extending upwardly therefrom.

2. A harness strap connecter and adjuster comprising a pair of side walls, a hook projecting therefrom and having an inwardly turned free end, a pair of outer transverse bars connecting the upper margins of said side walls, one of such bars being located adjacent the free end of said hook, a pair of transverse bars connecting the lower margins of said side walls and arranged inwardly of the outer transverse bars, one of said last mentioned bars having an inwardly turned prong, an intermediate bar positioned above and between said last mentioned bars, and an upwardly projecting stud carried by said intermediate bar.

In testimony that I claim the foregoing I have hereunto set my hand at Milwaukee, in the county of Milwaukee and State of Wisconsin.

JOHN C. NICHOLS.